May 1, 1956 — S. E. EKLUND — 2,743,495
METHOD OF MAKING A COMPOSITE CUTTER
Filed May 7, 1951 — 4 Sheets-Sheet 1
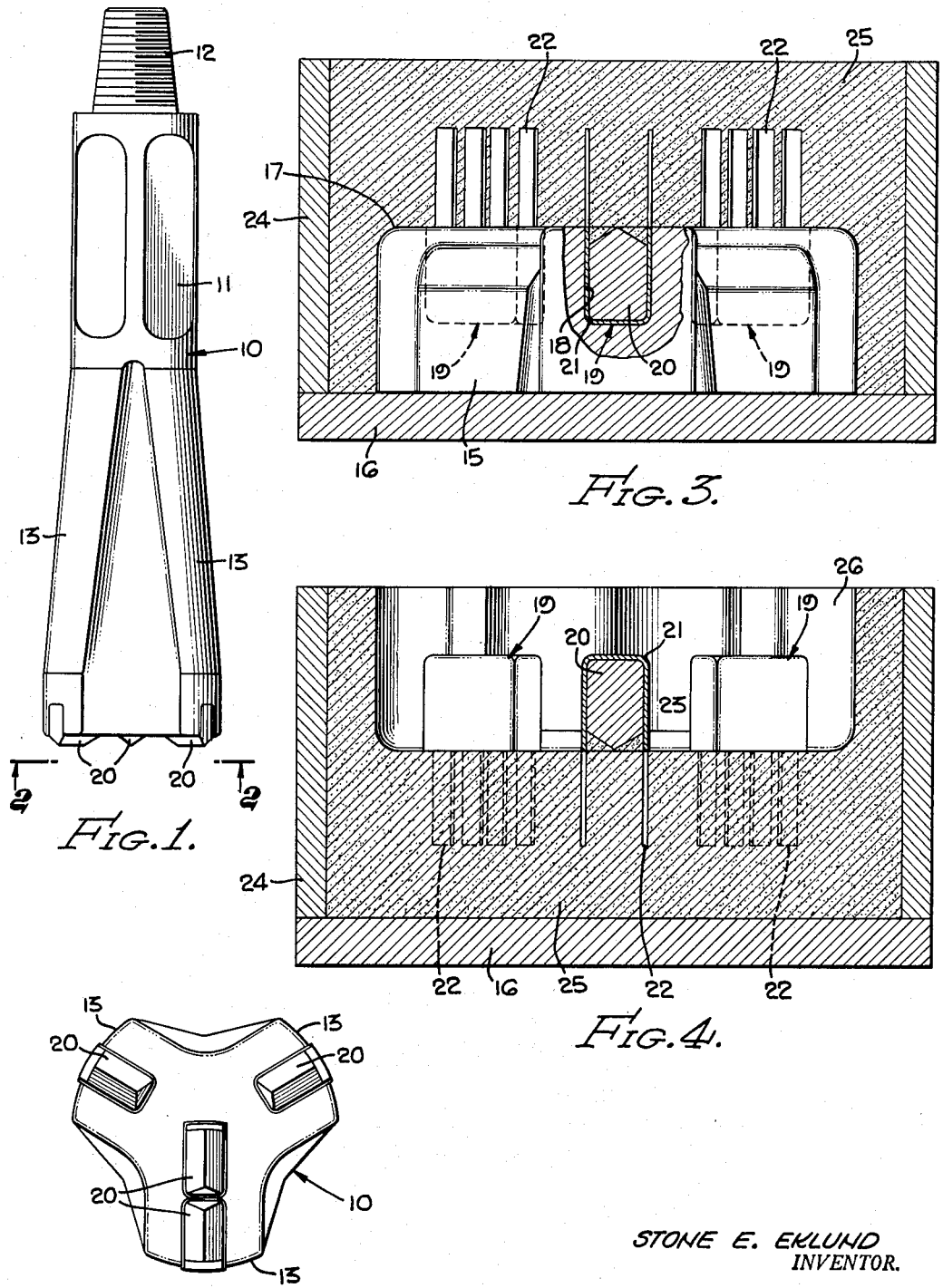
STONE E. EKLUND
INVENTOR.
BY Lyon & Lyon
ATTORNEYS

STONE E. EKLUND
INVENTOR.

BY Lyon&Lyon
ATTORNEYS

STONE E. EKLUND
INVENTOR.

BY Lyon & Lyon
ATTORNEYS

May 1, 1956  S. E. EKLUND  2,743,495
METHOD OF MAKING A COMPOSITE CUTTER
Filed May 7, 1951  4 Sheets-Sheet 4

STEEL — NICKEL
500X
ETCH: 2% NITAL

NICKEL
500X
ETCH: 2% NITAL

NICKEL — CEMENTED CARBIDE
500X
ETCH: 2% NITAL

INVENTOR
STONE E. EKLUND
BY Lyon & Lyon
ATTORNEYS

United States Patent Office 2,743,495
Patented May 1, 1956

2,743,495

METHOD OF MAKING A COMPOSITE CUTTER

Stone E. Eklund, Torrance, Calif., assignor to The National Supply Company, Pittsburgh, Pa., a corporation of Pennsylvania Application May 7, 1951, Serial No. 225,043

3 Claims. (Cl. 22—202)

This invention relates to a metallic article having hard metal inserts embedded therein, and to the method of making it. This invention is particularly useful in connection with the mounting of a cemented carbide insert in the body of a metallic tool, and the particular embodiment of my invention chosen for purposes of description is the mounting of tungsten carbide cutters in the working face of a drill bit of the type employed in the drilling of wells. In conventional practice the hard metal inserts are commonly mounted by brazing them to the metallic tool. I have found that brazing of hard metal inserts of this type to the tool body for use in drill bits gives unsatisfactory performance because the inserts are torn out of their mounting sockets by the severe impact forces and pounding imposed on them in service against the rock formation.

In accordance with my invention I cast the metal body of the bit around the cemented carbide inserts so that the metal body of the bit solidifies with the metallic inserts in place. The molten metal is not cast directly against the surface of the cemented carbide parts, but on the contrary an intermediate metallic jacket encloses the cemented carbide part and fuses both to said part and the metal body as the latter cools. I have also found it useful to preheat the tungsten carbide part and metallic jacket before pouring the molten metal of the body into position. In a specific example I have used a jacket of commercially pure nickel to enclose a cemented tungsten carbide insert and have then poured molten steel into position to form the body.

The nickel has substantially the same melting temperature as the steel and also has substantially the same melting temperature as cobalt, which is the binder ordinarily used for cementing the tungsten carbide material. The nickel is soft enough to allow the tungsten carbide insert and the steel body to cool at different rates without cracking at the joint between them.

I prefer to preheat the tungsten carbide part by electrical resistance heating means. In practice I have employed Nichrome wire coiled about a jacketed insert and disposed in a location to be enveloped by the molten steel forming the body. This resistance wire is preferably located in a position so that it may be machined off if desired before the drill bit is placed in service.

Among the objects of this invention is to provide a novel method of making a composite metal article which produces a superior article.

More particularly, it is an object of this invention to provide a method of imbedding a hard metal insert in the body of a metallic tool.

A more detailed object is to provide a novel method of mounting a cemented carbide cutter in the working face of a steel drill bit.

Another object is to provide an improved method of positioning an insert unit in a mold cavity for subsequent imbedding in a body of molten metal poured into the mold cavity.

Another important object is to provide a composite metal article having a hard metal insert imbedded in a metal body with an intermediate metallic jacket integrally united with both the hard metal insert and the metal body.

Other related and more detailed objects and advantages will appear hereinafter.

In the drawings:

Figure 1 is a side elevation of a drill bit of the type employed in the drilling of wells by the percussion process, and showing the position of the hard metal inserts at the lower end of the bit.

Figure 2 is a plan view of the lower working face of the bit showing the inserts in place.

Figure 3 is a sectional view showing a portion of the bit pattern in position within the mold and with the insert units positioned in sockets in the wood pattern.

Figure 4 is a view similar to Figure 3 showing the mold after it has been inverted and the wood pattern removed, leaving the insert units in place within the mold cavity.

Figure 10:
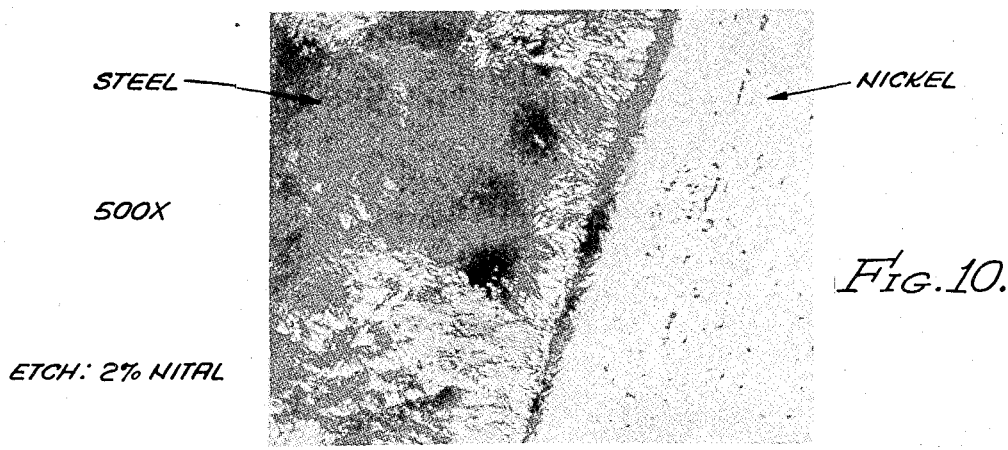
Figure 11:
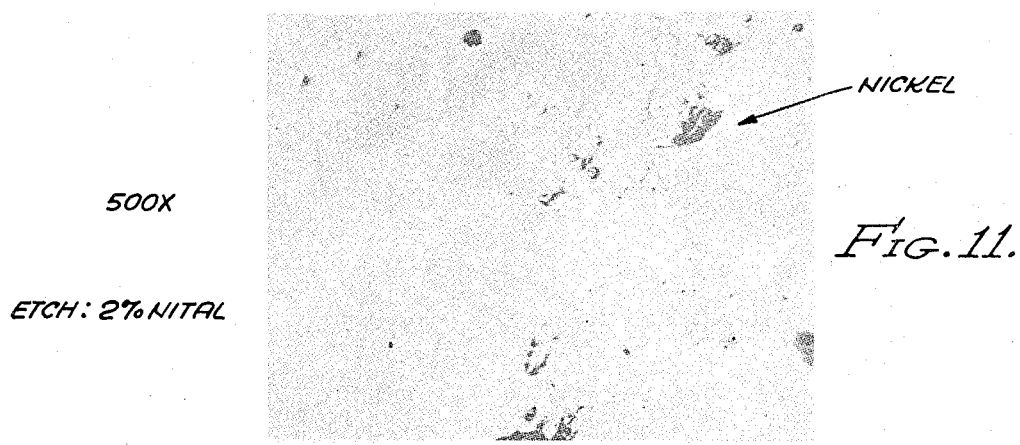
Figure 12:
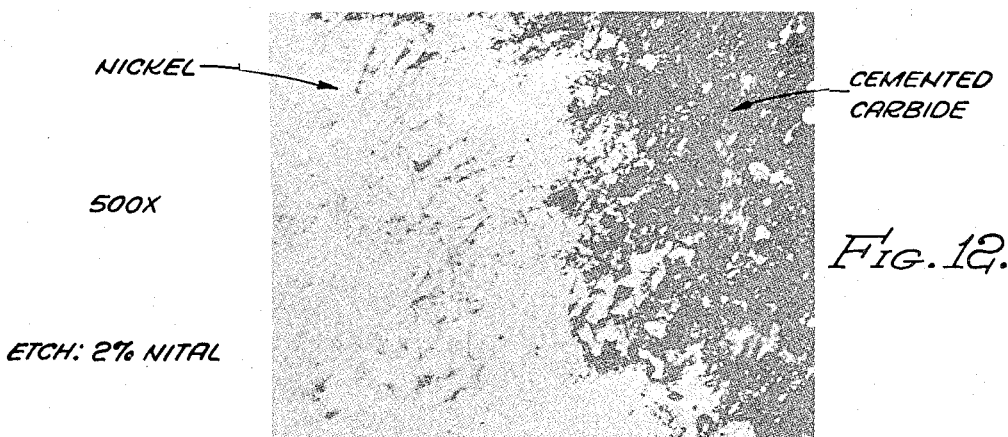

Figures 10 to 12 are photomicrographs taken at a magnification of 500 X showing the fusion of the nickel jacket both to the cemented carbide insert and to the steel body of the bit. Figure 10 shows the boundary between the steel body and the nickel. Figure 11 shows the nickel. Figure 12 shows the boundary between the nickel and the cemented carbide.

Referring to the drawings, the bit 10 is of the percussion type and is provided with a square shank 11 and a tapered projection 12 which is threaded for connection to the drill collar or sinker bar. The lower end of the bit is shaped to provide three flutes 13, and the hard metal inserts 20 are mounted in the lower faces of these flutes. Any desired pattern may be employed for mounting the inserts 20 on the drill bit 10, but I prefer to use the arrangement shown in Figure 2 in which two of the flutes 13 are provided with one insert each while the third flute is provided with two inserts. The two inserts on the latter flute are disposed so that one of them (the outer one) is positioned symmetrically with respect to the inserts on the other flutes, while the other insert (the inner one) is disposed radially inwardly. The three outer hard metal inserts 20 engage the outer portion of the bottom of the hole being drilled while the single inner insert engages the inner portion of the bottom of the hole.

In carrying out the method of my invention, I provide a wood pattern 15 of the shape corresponding to the desired shape of the lower portion of the mold cavity. This pattern 15 is placed in inverted position on a mold board 16 with the face 17 of the pattern directed upwardly. This face 17 corresponds to the lower working face of the completed bit. Sockets 18 are provided in the wood pattern 15 and extending into the face 17. Two short sockets and one long socket are provided. Into each of the short sockets 18 I place a single insert unit 19 and into the long socket 18 I position two insert units 19.

Each of the insert units 19 comprises a cutter 20 formed of cemented tungsten carbide. Each of these cutters 20 is inserted within a preformed box-like shell or jacket 21 which encloses the cutter on the top and on four sides. The lower side of each jacket 21 is open. Prongs 22 formed integrally with two of the sides of each jacket extend beyond the working surface 23 of the cutter. The insert units 19 are placed in the sockets 18 in inverted position with the prongs 22 extending upwardly beyond the face 17 of the pattern 15.

The lower mold part 24 is then placed on the board 16 and the cavity within the member 24 is filled with mold sand 25 in accordance with conventional foundry practice. When the sand has been rammed up properly the lower mold part 24 is inverted to the position shown in Figure 4 and the pattern 15 is lifted upwardly away from the mold sand 25 and away from the insert units 19 to define the lower end of the mold cavity 26. The prongs 22 which project into the mold sand anchor the insert units 19 precisely in the desired position.

Figure 7:
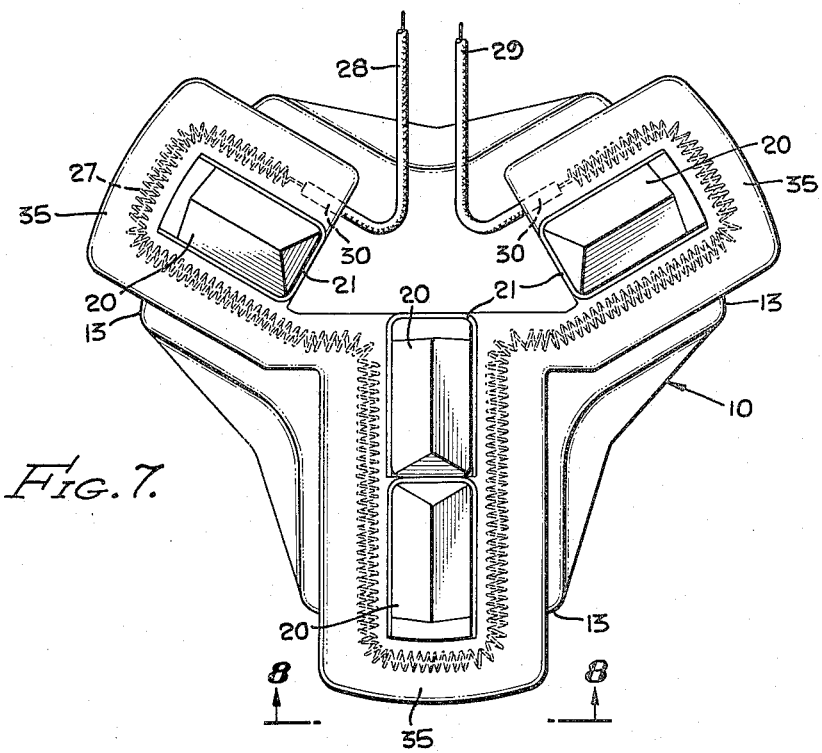
Figure 7 is an end elevation showing the bit as cast and showing the location of the electric resistance wire used for preheating.
Figures 8, 9:
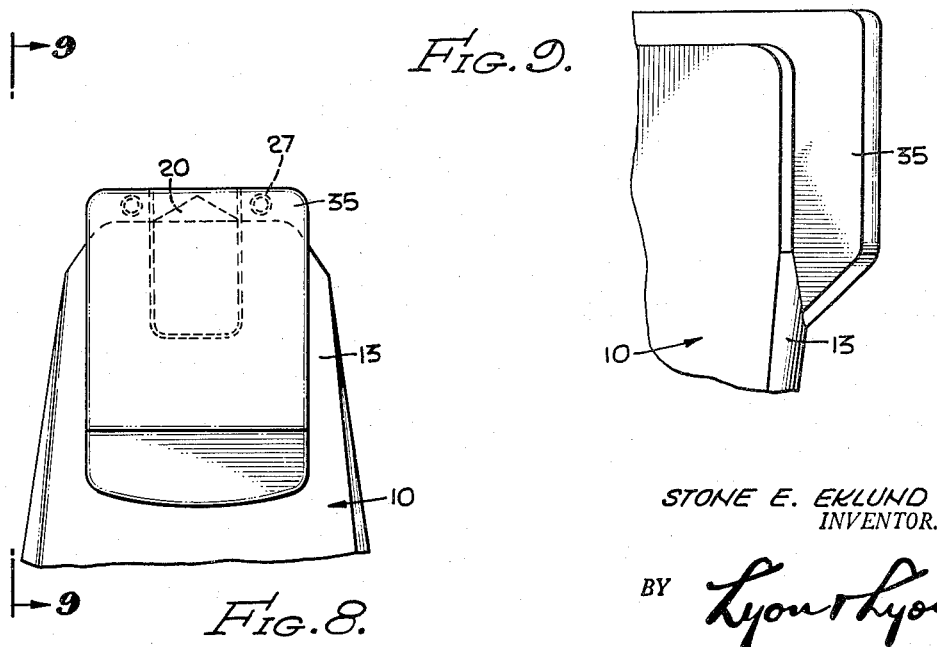
Figure 8 is a side elevation partly broken away taken in the direction 8—8 as shown in Figure 7.
Figure 9 is a fragmentary elevation taken substantially on the line 9—9 as shown in Figure 8.

Electric resistance Nichrome wire 27 in the form of a continuous coil is wrapped around the hard metal inserts 20 in the manner shown clearly in Figure 7. Electrical leads 28 and 29 extend outwardly through the mold sand and through the lower mold part for connection to a suitable source of electric current. The inner ends of the lead wires 28 and 29 are joined to the ends of the Nichrome wire coil by means of suitable fittings 30.

Figure 5:
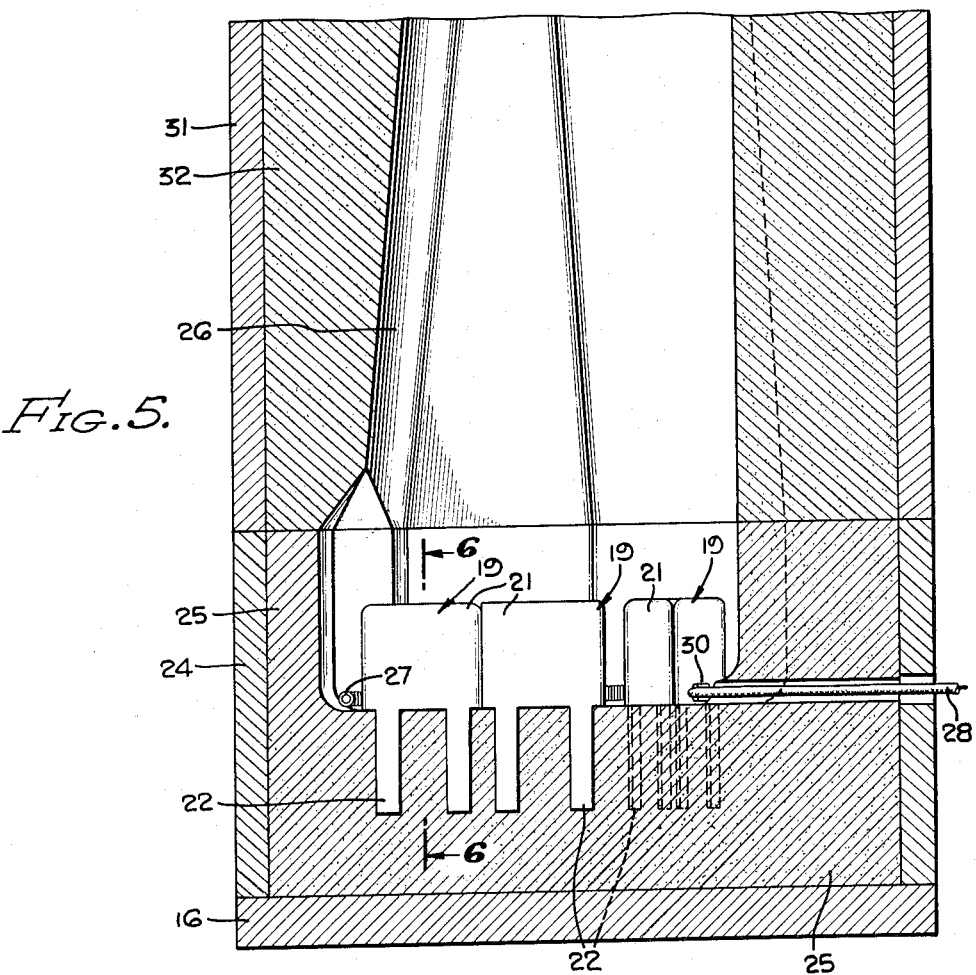
Figure 5 is a sectional view showing the completed mold before the molten steel is poured into it.
Figure 6:
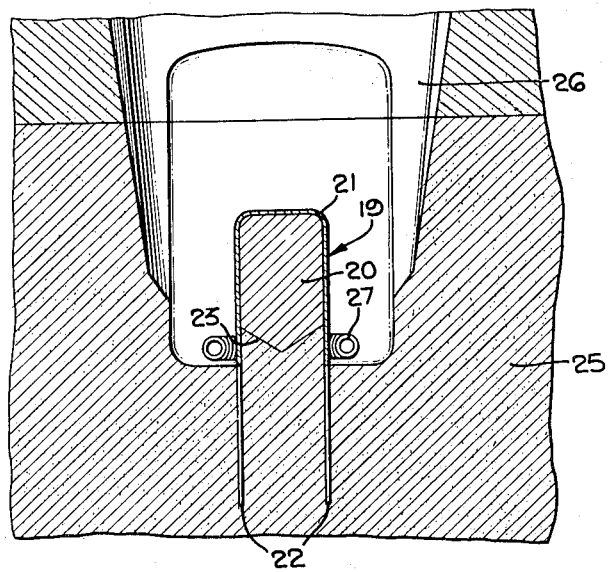
Figure 6 is a sectional detail showing an insert unit in position within the mold cavity and showing the position of the electric resistance wire for preheating the insert unit.

The upper mold part 31 is employed in the conventional manner for ramming up a sand body 32 about a pattern (not shown) which corresponds to the upper portion of teh drill bit 10. The pattern is removed from the mold to define the upper portion of the mold cavity 26. The upper mold part 31 and sand body 32 are then lowered into position over the mold part 24 and its sand body 25 as shown in Figure 5. The mold parts 24 and 31 are connected by conventional means (not shown) to prevent lateral shifting and to prevent separation when the molten metal enters the mold cavity 26.

Electrical energy is then supplied through the lead wires 28 and 29 to preheat the insert units 19 by heat from the electric resistance Nichrome wire 27. In practice I have preheated the nickel jackets 21 and tungsten carbide cutters 20 to a temperature of about 1100° F.

The mold cavity 26 is then filled with molten steel in accordance with conventional foundry practice. I have successfully used steel of the following composition:

| | |
|---|---|
| Carbon | .53% to .58%. |
| Manganese | .30% to .50%. |
| Silicon | .20% to .30%. |
| Phosphorus | .20% maximum. |
| Sulphur | .20% maximum. |
| Nickel | .40% to .50%. |
| Chromium | 1.00% to 1.20%. |
| Molybdenum | .45% to .55%. |
| Vanadium | .10% to .15%. |
| Iron | Balance. |

The pouring temperature of this steel composition is approximately 2850° F. This is approximately the same as the melting temperature of nickel and is also approximately the same as the melting temperature of cobalt which is used as the binder for the cemented carbide material. The preheating current in the lead wires 28 and 29 is shut off when the molten steel is introduced into the mold cavity 26. The molten steel is allowed to cool slowly in the mold and to solidify in the usual fashion. While the steel is molten it fuses with the nickel jackets 21 and the jackets fuse with the cemented carbide cutters 20. The jackets 21 serve to shield the cemented carbide cutters 20 from the thermal shock of direct impingement of molten metal and also fuse with both the tungsten carbide cutters and the steel body of the bit.

In practice I have successfully used nickel jackets 21 having a wall thickness of about 0.050 inch and the enclosed cutter measured about 1¼ x 1½ x 2¼ inches. One of the important functions of the nickel jacket is believed to be that it allows the steel body to contract at a much greater rate than the cemented carbide cutter 20 without cracking either of the parts or without developing cracks at the joint between them. Nickel is relatively soft, and it is believed that this property enables it to change shape during cooling to prevent objectionable cracking.

Photomicrographs of the boundaries between the stem body and the nickel jacket and between the nickel jacket and the cemented carbide cutter are shown in Figures 10 and 12 respectively. These photomicrographs were taken at 500 magnification. The etch was 2% Nital.

From these photomicrographs it is plain that the nickel has fused integrally with both the steel and the cemented carbide. The alloying effect of the nickel carries over both into the steel and into the cobalt binder of the cemented carbide. A nickel steel alloy sheath is thus formed which encloses the cemented carbide cutter.

After the molten steel has solidified and cooled, it is removed from the mold in the usual way. The steel pads 35 around the working face of the bit may be removed by machining, so that the cutters 20 project below the lower face of the steel body 10. The Nichrome wire 27 is located within these pads 35 so that it is removed by the machining operations.

This integral bonding of the cemented carbide cutter with the steel body of the bit gives a superior mounting which retains the cutters in place in the severe service to which the bit is subjected.

Having fully described my invention, it is to be understood that I do not wish to be limited to the details herein set forth, but my invention is of the full scope of the appended claims.

I claim:

1. The method of making a tool having a cemented tungsten carbide cutter, comprising the steps of: inserting at least the portion of the cutter to be disposed in a mold cavity in a preformed nickel jacket, said portion being entirely covered by the jacket; mounting the jacketed portion of the cutter in a mold cavity so that the jacketed portion only extends into the mold cavity; filling the mold cavity with molten steel to fuse the nickel jacket to both the cutter and to the steel; and cooling the molten steel, cutter and jacket to unite them integrally.

2. The method of making a tool having a cemented tungsten carbide cutter, comprising the steps of: inserting at least the portion of the cutter to be disposed in a mold cavity in a preformed nickel jacket, said portion being entriely covered by the jacket; mounting the jacketed portion of the cutter in the mold cavity so that the jacketed portion only extends into the mold cavity; preheating the cutter and jacket by passing an electric current through a resistance wire disposed adjacent the jacket; and filling the mold cavity with molten steel to fuse the nickel jacket to both the cutter and to the steel.

3. The method of making a tool having a cemented tungsten carbide cutter, comprising the steps of: forming a mold cavity in the general shape of the tool; inserting at least the portion of the cutter to be disposed in the mold cavity in a preformed nickel jacket, said portion being entirely covered by the jacket; mounting the jacketed portion of the cutter in the mold cavity so that the jacketed portion only extends into the mold cavity; positioning an electric resistance wire in the mold cavity adjacent the jacket; preheating the cutter and jacket by passing an electric current through the resistance wire; introducing molten steel into the mold cavity to fuse the nickel jacket to both the cutter and to the steel; cooling the molten steel, cutter and jacket to unite them integrally; and removing the portion of the cast steel in which the resistance wire is embedded.

(References on following page)

References Cited in the file of this patent

UNITED STATES PATENTS

| | | |
|---|---|---|
| 370,436 | Wheeler | Sept. 27, 1887 |
| 414,569 | Palmer | Nov. 5, 1889 |
| 740,874 | Krause | Oct. 6, 1903 |
| 751,180 | Krause | Feb. 2, 1904 |
| 950,637 | Latcher | Mar. 1, 1910 |
| 1,335,862 | Short et al. | Apr. 6, 1920 |
| 1,496,996 | Moore | June 10, 1924 |
| 1,512,862 | Sayre | Oct. 21, 1924 |
| 1,576,317 | Eklind | Mar. 9, 1926 |
| 1,587,900 | Cordino | June 8, 1926 |
| 1,844,351 | Falkenstein | Feb. 9, 1932 |
| 1,872,899 | Corey | Aug. 23, 1932 |
| 1,909,975 | Mackey et al. | May 23, 1933 |
| 1,926,770 | Harris et al. | Sept. 12, 1933 |
| 1,955,981 | Smith | Apr. 24, 1934 |
| 2,019,934 | Schroter et al. | Nov. 5, 1935 |
| 2,020,117 | Johnston | Nov. 5, 1935 |
| 2,333,622 | McNab | Nov. 2, 1943 |
| 2,251,820 | Cadwell | Aug. 5, 1941 |
| 2,578,351 | Griffiths | Dec. 11, 1951 |
| 2,579,268 | Malherbe | Dec. 18, 1951 |
| 2,593,751 | Grolee | Apr. 22, 1952 |
| 2,669,432 | Dill et al. | Feb. 16, 1954 |